United States Patent [19]

Ong

[11] Patent Number: 5,986,622

[45] Date of Patent: *Nov. 16, 1999

[54] PANEL DISPLAY OF MULTIPLE DISPLAY UNITS FOR MULTIPLE SIGNAL SOURCES

[75] Inventor: Ping-Wen Ong, Middletown, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/655,353

[22] Filed: May 24, 1996

[51] Int. Cl.⁶ .................................................. G09G 5/00
[52] U.S. Cl. .............................................. 345/1; 345/903
[58] Field of Search .................................. 345/1, 2, 3, 4, 345/903; 348/383; 395/200.01, 200.02

[56] References Cited

U.S. PATENT DOCUMENTS

| | | | |
|---|---|---|---|
| 3,648,249 | 3/1972 | Goldsberry | 345/1 |
| 4,001,807 | 1/1977 | Dallinonti | 345/1 |
| 4,800,376 | 1/1989 | Suga et al. | 345/1 |
| 4,901,155 | 2/1990 | Hara | 348/383 |
| 4,965,559 | 10/1990 | Dye | 345/1 |
| 5,079,636 | 1/1992 | Brody | 345/903 |
| 5,105,183 | 4/1992 | Beckman | 345/1 |
| 5,129,028 | 7/1992 | Soltan | 345/1 |
| 5,361,078 | 11/1994 | Caine | 345/1 |
| 5,396,257 | 3/1995 | Someya et al. | 345/1 |
| 5,523,769 | 6/1996 | Lauer et al. | 345/1 |
| 5,530,457 | 6/1996 | Helgeson | 345/1 |
| 5,559,525 | 9/1996 | Zenda | 345/1 |
| 5,602,983 | 2/1997 | Haba et al. | 345/1 |
| 5,657,046 | 8/1997 | Noble et al. | 345/1 |
| 5,663,739 | 9/1997 | Pommerenke et al. | 345/1 |
| 5,668,569 | 9/1997 | Greene et al. | 345/903 |
| 5,796,376 | 8/1998 | Banks | 345/1 |
| 5,805,117 | 9/1998 | Mazurek et al. | 345/1 |

*Primary Examiner*—Jeffery Brier
*Assistant Examiner*—Paul A. Bell
*Attorney, Agent, or Firm*—Gibbons, Del Deo, Dolan, Griffinger & Vecchione

[57] ABSTRACT

A panel display system having at least one source device coupled to a plurality of display units interconnected to form a larger display having any desired size and shape. Each display unit is a self-contained panel display having a video random access memory (VRAM) for storing image data, a controller for processing data signals to provide the image data to the VRAM, and an image display panel for displaying the image data. The self-contained panel displays substantially reduce the need for a separate driver card for each panel display, and substantially reduce the communications bandwidth between the source devices and the panel displays of the system. Means for interconnecting the display units include the use of data/control bus connectors and power line connectors, cables, network devices, local area networks, and/or wide area networks.

42 Claims, 8 Drawing Sheets

BUS PORT
POWER PORT

DATA/CONTROL
BUS CONNECTOR

FRONT VIEW

DATA/CONTROL
BUS CONNECTOR

BACK VIEW

COMPUTING X COORDINATE

PANEL DISPLAY OF MULTIPLE DISPLAY UNITS FOR MULTIPLE SIGNAL SOURCES

FIELD OF THE INVENTION

The present invention relates in general to the field of displays, and more particularly to a panel display apparatus and a system of panel displays.

BACKGROUND OF THE INVENTION

Heretofore, an increasing need for flat panel display units that can be connected to each other in a mosaic-like fashion, to form a larger display area having various sizes and shapes, has been recognized by industry in such technical fields relating to computers.

The display system for the Apple Macintosh® is one attempt at solving this problem. The Macintosh® display system provides display panels that can be arranged in any desired manner to form a larger display area as long as the display panels do not overlap with each other. That is, the displays can be arranged into different configurations as long as the logical display area of the configuration does not provide redundancy between the display panels.

A configuration of such displays, however, can be utilized by only one source device (i.e. one Macintosh® computer). As a result, the Macintosh® panel display system is source device specific, and thus not useful to those having a need to interface a plurality of source devices to a display area consisting of a plurality of such Macintosh® panel displays. In addition, the Macintosh® display system is not desirable or useful to those having a need to interface different types of source devices (e.g. TV's, computers and network devices) to the same display area.

Moreover, each display panel or unit of the Macintosh® system is driven and controlled by a separate display control card placed in the expansion slots of the source device (i.e. Macintosh® computer). As a result, since each source device has a limited number of expansion slots available for such control cards, the number of displays that can be added to the display area is limited, and thus the size of the display area of the Macintosh® display system is limited.

SUMMARY OF THE INVENTION

Accordingly, the present invention is directed to a panel display system having the capability of interconnecting a plurality of different source devices to a plurality of display units connected in a mosaic-like manner to form a larger display area, wherein the display area can be arranged into a substantially limitless number of sizes and configurations. To attain this, the present invention provides a system having a plurality of self-contained display units, wherein each display unit has a video random access memory (VRAM) for storing image data, a controller for processing data signals to provide the image data to the VRAM, and an image display panel for displaying the image data.

In one embodiment, a plurality of self-contained display units are arranged into substantially a rectangular shaped display area, wherein each display unit has a controller, VRAM, Flash memory, a liquid crystal display (LCD), and a bus for data control and power. The display units are interconnected with each other and a plurality of source devices (e.g. TV's, computers and network devices) through data/control bus connectors. Upon power-up of the display system, each source device enters into a self-configuration mode, wherein each display unit runs the same algorithm to determine its relative position with respect to the other display units. From these coordinates, each source device can determine how to display information in the display area.

Other means for interconnecting the display panels such as cables, network devices, local area networks and wide area networks can also be used. Thus, the present invention overcomes, to a large extent, the limitations associated with the prior art.

These and other features of the invention are described in more complete detail in the following detailed description of embodiments of the invention when taken with the drawings. The scope of the invention, however, is limited only by the claims appended hereto.

BRIEF DESCRIPTION OF THE DRAWINGS

Various embodiments of the present invention are described and illustrated herein with reference to the drawings in which like items are indicated by the same reference designation, wherein.

DETAILED DESCRIPTION OF VARIOUS ILLUSTRATIVE EMBODIMENTS

Figure 1:
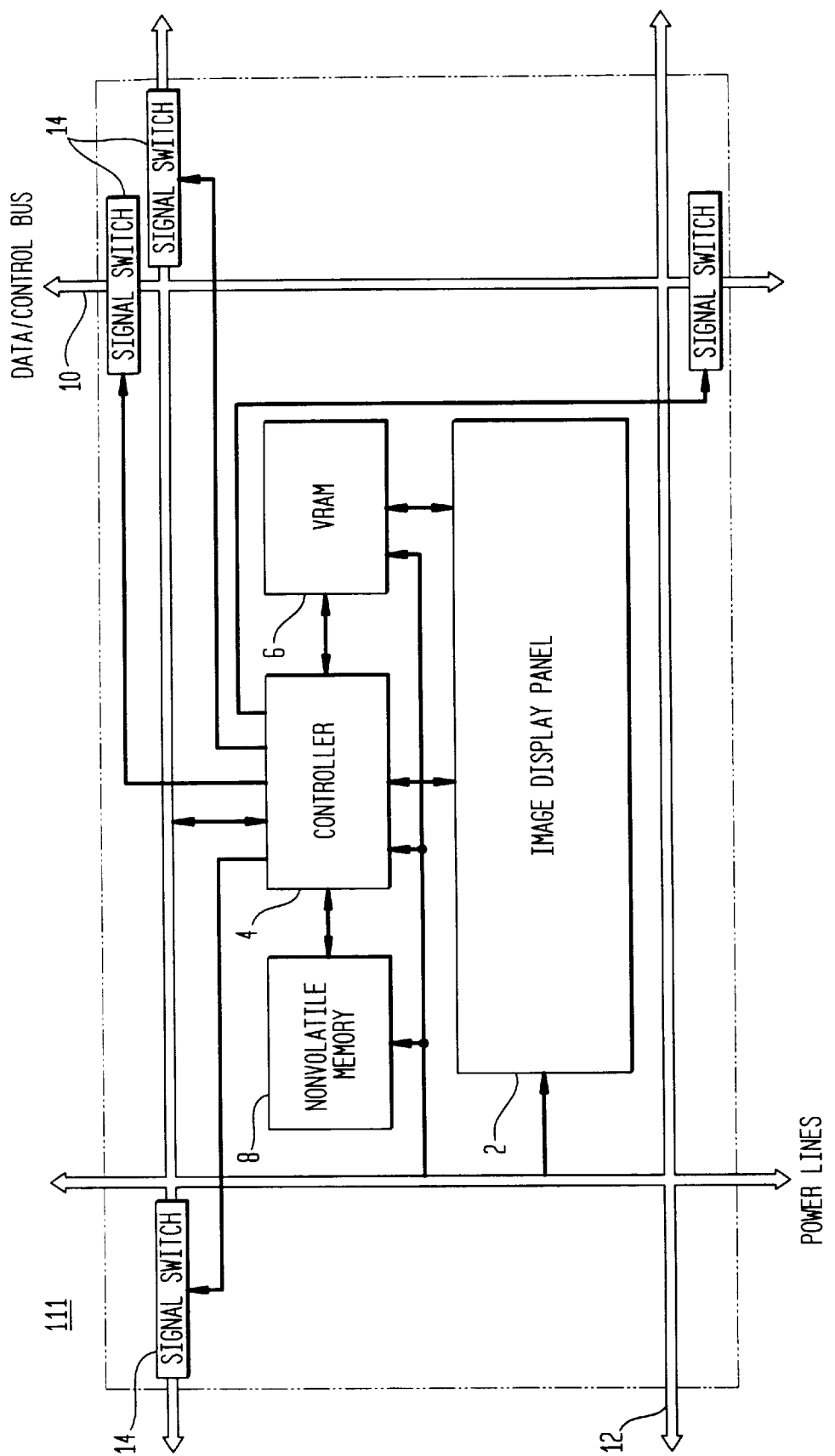
FIG. 1 is a block schematic diagram of one embodiment of a display unit utilized in the display system according to the present invention.

Turning now to FIG. 1, there is shown a block schematic diagram of one embodiment of a panel display 111 for use in a display system according to the present invention. As shown, display 111 has an image display panel 2 coupled to a controller 4, a VRAM 6, and power lines 12. Controller 4 is coupled to VRAM 6, a nonvolatile memory 8, a bus 10 for data and control signals, power lines 12, and switches 14. Both VRAM 6 and nonvolatile memory 8 are coupled to power lines 12. A side perspective view of display unit 111 is shown in FIG. 2, and a back view of display 111 is shown in FIG. 3.

Figure 2:
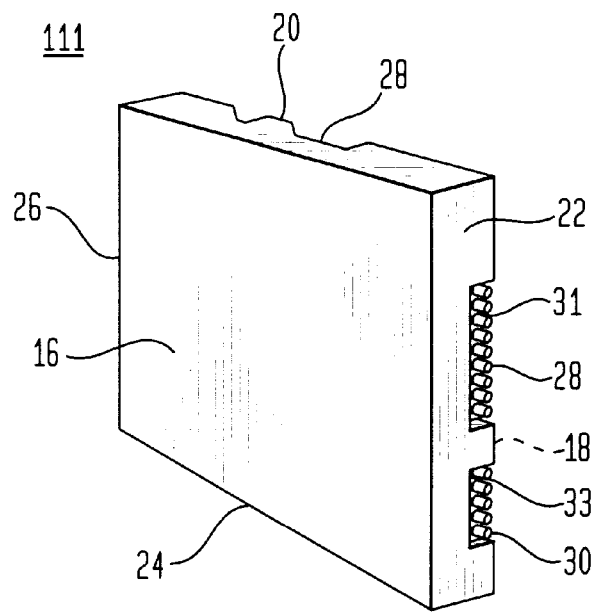
FIG. 2 is a side perspective view of the display unit shown in FIG. 1.
Figure 3:
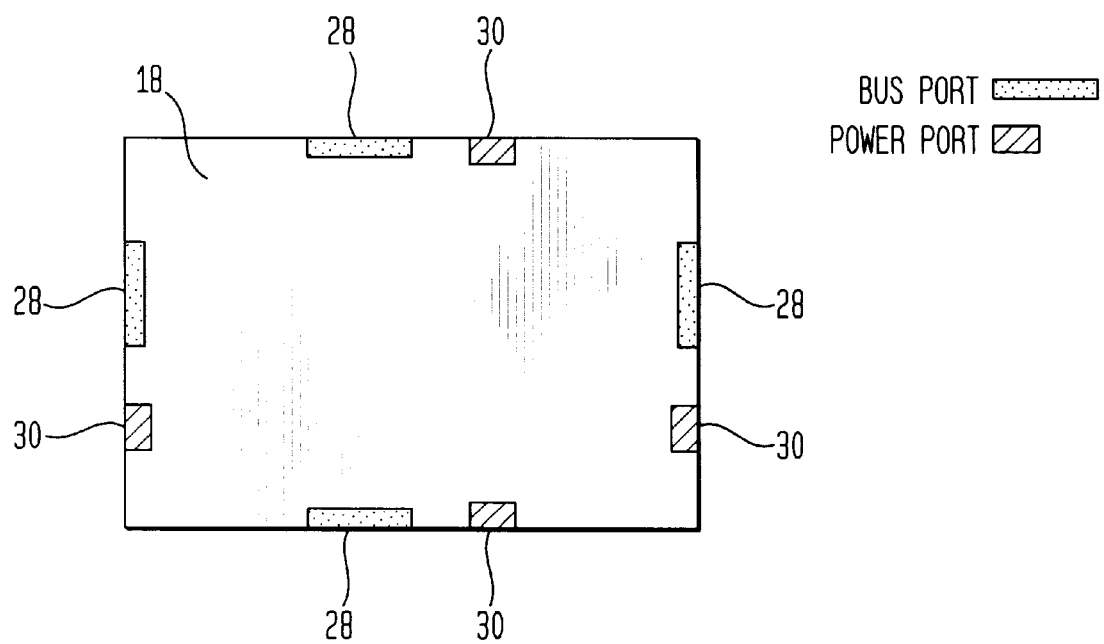
FIG. 3 is a back view of the display unit shown in FIG. 1.

Referring to FIG. 2 and FIG. 3, a side perspective view of the display unit 111 and back view of the display unit 111, respectively, are shown. The display unit 111 is self-contained and modular and can be connected in a mosaic-like manner to an unlimited number of display units 111 to form a larger display area in virtually a limitless number of sizes and configurations. The display unit 111 is a flat panel having a front face 16, back face 18, and side faces 20, 22, 24 and 26. The image display panel 2 is located on the front face 16.

In one embodiment of display unit 111, there are four side faces 20, 22, 24, and 26 that form a rectangular shaped unit 111. It shall be recognized, however, that the shape of the display unit 111 is not limited to rectangular. Other suitable shapes include circular, rhomboid, trapezoidal, triangular, square, or any desired arbitrary shape.

On the back face 18 of unit 111, there is at least one data/control port 28 which provides a means for the data/control bus 10 of unit 111 to interconnect with the data/control bus of other display units and sources devices (not shown). In addition, each unit 111 has at least one power port 30 for interconnecting unit 111 with other display units and source devices (not shown).

The data/control port 28 and power port 30 are preferably located near each side face 20, 22, 24, 26 so that there are at least four data/control ports 28 and four power ports 30 located on the back face 18. The data/control port 28 and power port 30 could alternatively be located on one or more of the side faces 20, 22, 24, 26 instead of the back face 18. The data/control port 28 and power port 30 each have a plurality of pins 31, 33, respectively, protruding the port 28,30. These pins 31 enable the data/control port 28 of unit 111 to be connected to a data/control port 28 of another display unit through a data/control bus connector 32, or alternatively, to connect unit 111 to a source device (not shown). The power port 30 can be connected to another power port 30 via the pins 33 as well. If a back face 18 of the display unit 111 does not have a data/control port 28 and power port 30, then it cannot be connected to another display unit 111.

Figure 4:
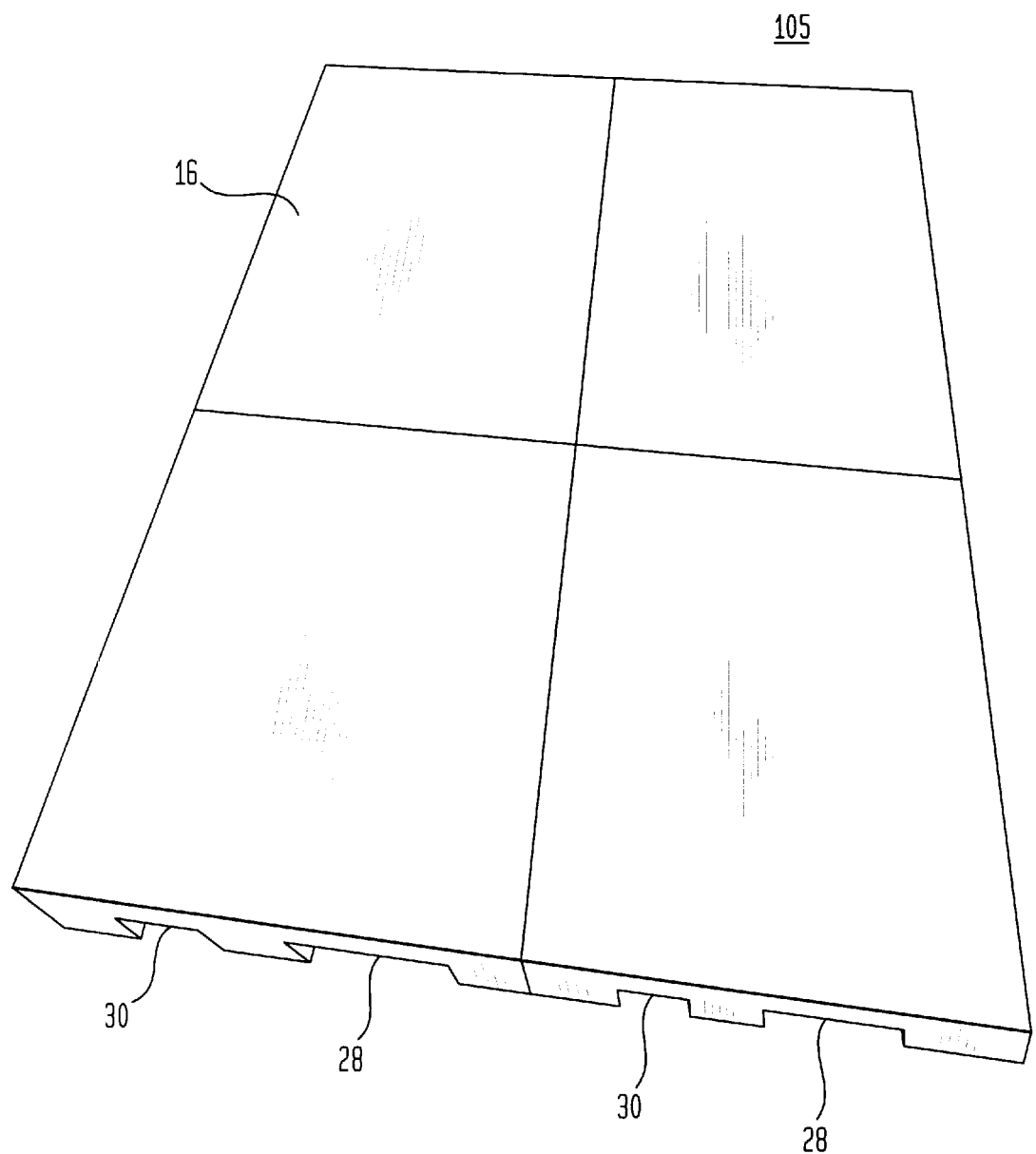
FIG. 4 is a top perspective view of a plurality of the display units shown in FIG. 1 interconnected to form a larger display area according to the present invention.
Figure 5:
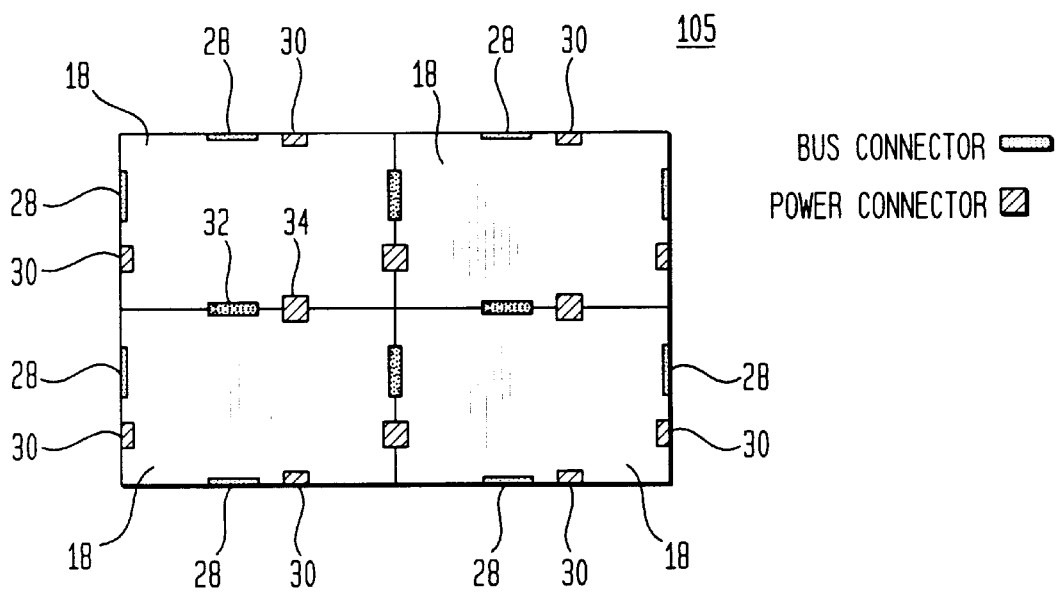
FIG. 5 is a back view of the larger display area shown in FIG. 4.

A plurality of display units 111 can be interconnected and arranged into virtually a limitless number of different configurations and sizes. One such configuration is shown in FIG. 4. As shown, four display units 111 are arranged in a substantially rectangular formation 105. The interconnection of the units 111 into formation 105 can be seen in a back view of formation 105, shown in FIG. 5. As shown, the data/control ports 28 of adjacent units 111 are aligned such that they interconnect through connector 32. Similarly, power line ports 30 of adjacent units 111 are interconnected through a power connector 34. Through these connection a plurality of displays can be arranged as desired to form a large display area for displaying data, in any desired form, from the source devices (not shown).

A more detailed view of one embodiment of data/control connectors 32 and power line connector 34 is shown in FIGS. 6–9. Referring to FIGS. 6–9, there is shown a front (FIG. 6) and back (FIG. 7) view of the data/control bus connector 32, and a front (FIG. 8) and back (FIG. 9) view of the power line connector 34. As discussed above, the data/control port 28 of one display unit 111 is connected to at the data/control port 28 of an adjacent display unit 111 via a data/control bus connector 32. Likewise, the power port 30 of one display unit 111 is connected to the power port 30 of an adjacent display unit 111 via a power line connector 34.

The data/control bus connector 32 and power line connector 34 should be durable and strong enough to bind two adjacent displays units 111. As a result, both data/control bus connector 32 and power line connector 34 can be made from materials such as plastic and metal. Although the data/control bus connector 32 and power line connector 34 are shown as having a rectangular shape, they can have any arbitrary shape desired.

Figure 6:
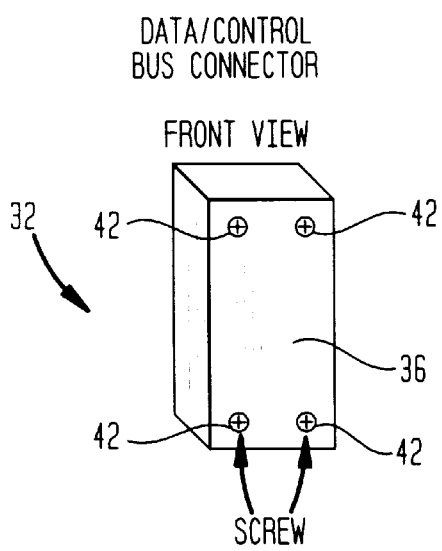
FIG. 6 is front view of one type of data/control bus connector for interconnecting the panel displays shown in FIG. 4.
Figure 7:
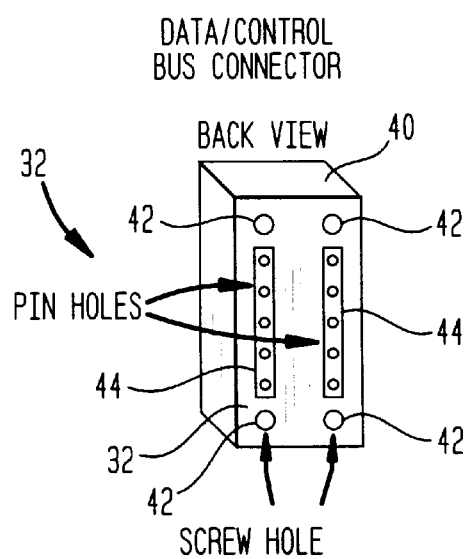
FIG. 7 is a back view of the data/control bus connector shown in FIG. 6.

In the embodiment shown in FIGS. 6 and 7, data/control bus connector 32 has a front surface 36, a back surface 38, and at least one side surface 40. The front surface 36 has at least two openings 42 which extends through the back surface 38. Screws are fitted into the openings 42 to secure the data/control bus connector 32 onto the display unit 111. The back surface 38 has a plurality of portions 44 defining holes. The portions 44 of the back surface 38 are approximately the size of the pins 31 protruding from the data/control port 28. These portions 44 are fitted to the pins 31 of the data/control port 28.

Figure 8:
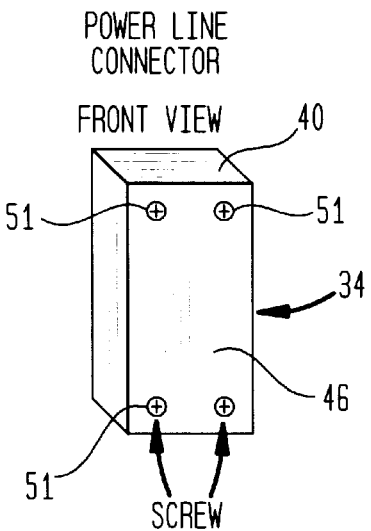
FIG. 8 is a front view of one type of power line connector for interconnecting the panel displays shown in FIG. 4.
Figure 9:
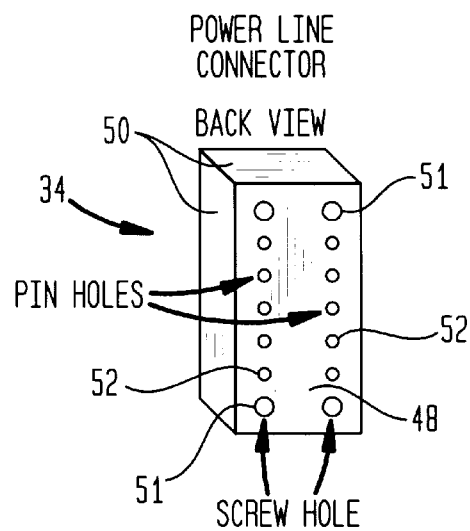
FIG. 9 is a back view of the power line connector shown in FIG. 8.

In the embodiment shown in FIGS. 8 and 9, power line connector 34 has a front surface 46, a back surface 48, and at least one side surface 50. The front surface 46 has at least two openings 51 which extends through the back surface 48. Screws are fitted into the openings 51 to secure the power line connector 34 onto the display unit 111. The back surface 46 has a plurality of portions 52 defining holes. The portions 52 of the back surface 46 are approximately the size of the pins 33 protruding from the power port 30. These portions 52 are fitted to the pins 33 of the power port 30 of the display unit 111.

Figure 10A:
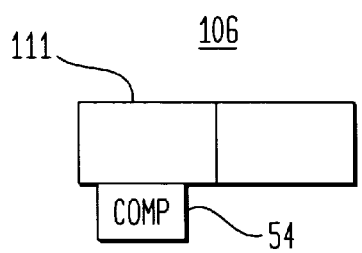
FIG. 10 illustrates various embodiments of the display system according to the present invention.
Figure 10B:
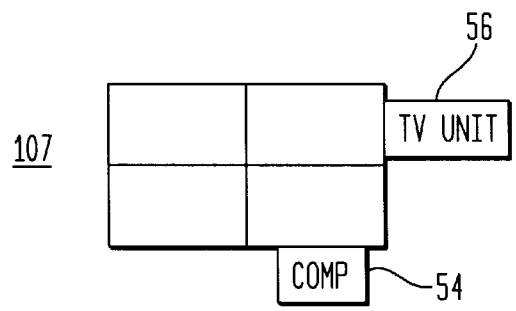
Figure 10C:
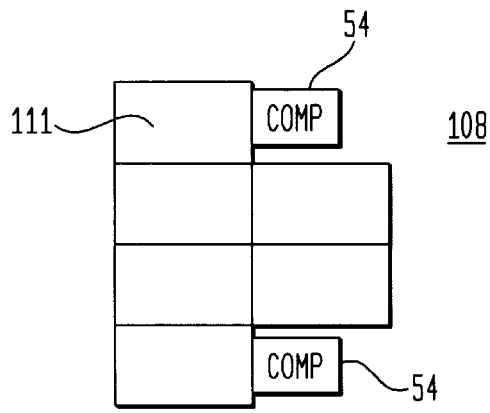

Referring to FIG. 10, there is shown three illustrative embodiments (106, 107 and 108) of the display system according to the present invention. As shown, embodiment 106 has a computer source device 54 coupled to two display units 111 arranged to form a substantially rectangular display area. Embodiment 107 has a computer 54 and a TV unit source device 56 electrically coupled to a display area consisting of four display units 111. Embodiment 108 has two computer source devices 54 coupled to a display area consisting of a plurality of display units 111. These embodiments are illustrative of the many possible configurations of the display system according to the present invention, wherein different source devices can be connected to the same display area formed from any number of display units arranged in any desired formation.

To achieve maximum benefit from the formation of multiple display units 111, however, the display units 111 should have the same resolution, i.e. pixel per inch, have the same dimensions, and provide the same color depth. Although the display system of the present invention can be designed with display units having different resolution, color depth and/or dimensions, a system composed of such units may provide undesirable effects, such as duplicated pixels and distortion.

In operation, image display panel 2 is used for displaying the image data sent to a particular display unit 111. Such image display panels 2 are preferably flat, and can be a liquid crystal display (LCD), plasma display, or light emitting diode (LED) display. VRAM 6 stores image data which is to be displayed on display panel 2. Since each unit of a display area formed from a plurality of display units has such a VRAM 6, each display unit of the display system need not receive a separate data command for each screen of video. That is, each source device of such an embodiment of the present invention only needs to send data commands to the panel displays when there is some change in the video displayed (e.g. changes in foreground color). As a result, the bandwidth requirement is substantially reduced for the communications between each panel display and the source devices.

The controller 4 of display units 111 is an embedded processor which processes the data and control commands sent through the bus 10 from the source devices. As a result, controller 4 processes commands, sets-up the image data in VRAM 6, reads/writes data to and from the nonvolatile memory 8, and controls display characteristics such as contrast and brightness.

The nonvolatile memory 8 stores vital information about the particular display 110. This information includes color look-up tables, local coordinates, color depth, display height, display width, pixel resolution, and logical pixel size. The nonvolatile memory 8 is typically Flash memory or erasable programmable read only memory (EPROM). As described above, data/control bus 10 connects the controller 4 to the data/control ports 28 located on the back of the display unit 111, and power supply lines 12 connect the power ports 30 to display unit 111 with power.

Controller 4 uses the flow of data between unit 111 and adjacent display units. When the controller 4 opens the signal switch 14, no data and control signals on bus 10 flows between corresponding adjacent display units 111. Conversely, when signal switch 14 is closed, signals flow freely between display units 111. As a result, controller 4 uses switch 14 to partition displays for multiple source devices in order to increase bus utilization. For example, if four display units 111 are connected together to form one display, a television unit (source device) can display video on several display units 111, while a computer can display information on the remaining display units 111 of the display area, without performance degradation. Moreover, since display units 111 can be configured with their own intelligence and memory, they can accept commands from each source device connected to the display area, and display any data intended for that unit.

Common source devices include computers, broadcast television adapters, cable television adapters, camcorders, and digital cameras. More than one and any combination of such source devices can be connected to a display area of a display system according to the present invention at one time. In addition, one source device such as a computer can control many different display units 111 which are connected by simple data wires or on a network. Input/Output (I/O) devices such as network devices, pointer devices, keyboards, touch screens, printers, and wireless connectors can also be attached to the display units 111 through the data/control port 28.

These source devices need special interfaces to drive the display area. For example, a television unit interface will have the data/control bus connector 32 connected to a unit display 111 on one side and have a regular audio/video connector on the other side. The television unit interface will have a small embedded processor to convert the video sweeping signal to commands and sends these commands to the data/control bus 10. The TV unit interface may also have a built in TV tuner to receive a signal directly from the air. Conversely, to connect a computer to such a display area, the computer needs to have a special interface to replace the traditional display card and software driver in the system to drive these displays.

Figure 11:
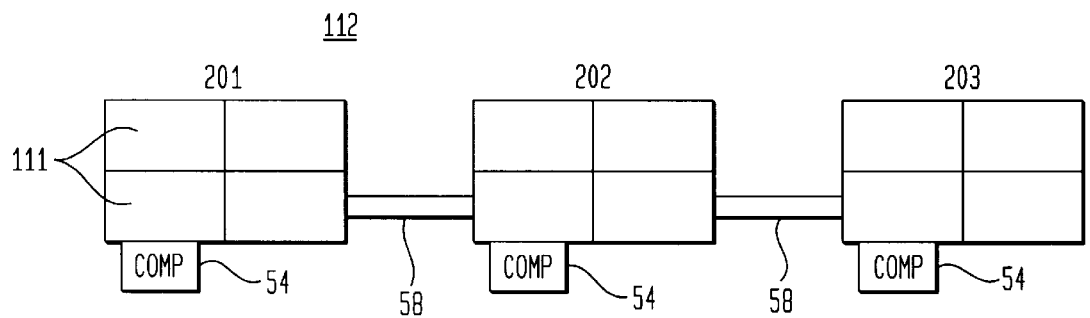
FIG. 11 is a diagram of another embodiment of the present inventive display system showing panel displays interconnected with cables.

Referring to FIG. 11, there is shown a diagram exemplifying a larger display system 112 composed of three smaller display systems 201, 202 and 203, connected together through cable 58. Cable 58 enables the interconnection of display units 111 without having to be adjacent to each other. As a result, one or more computers could control the three display systems 201, 202, and 203.

Figure 12:
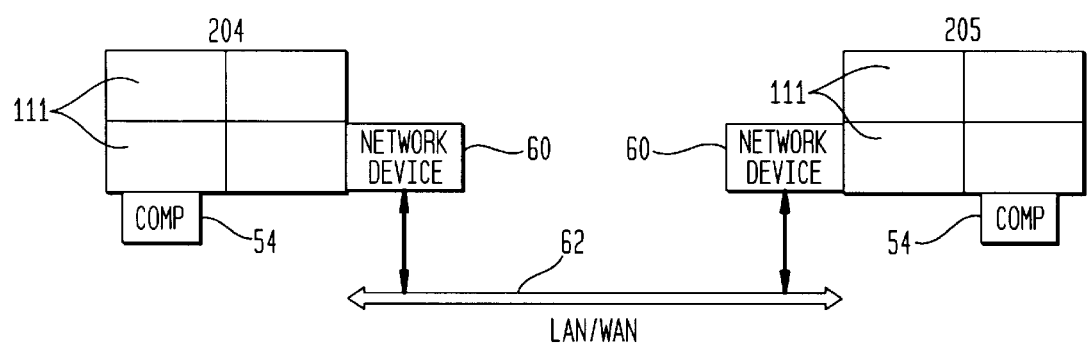
FIG. 12 is a diagram showing another embodiment of the invention wherein panel displays are interconnected in a network configuration.

Similarly, FIG. 12 shows two display systems 204 and 205, each having a plurality of display units 111, interconnected in a network configuration through a network device 60 acting as a source device. As shown, a local area network/wide area network (LAN/WAN) 62 is used to connect the network device 60 so that the displays 204 and 205 can communicate with each other.

Figure 13:
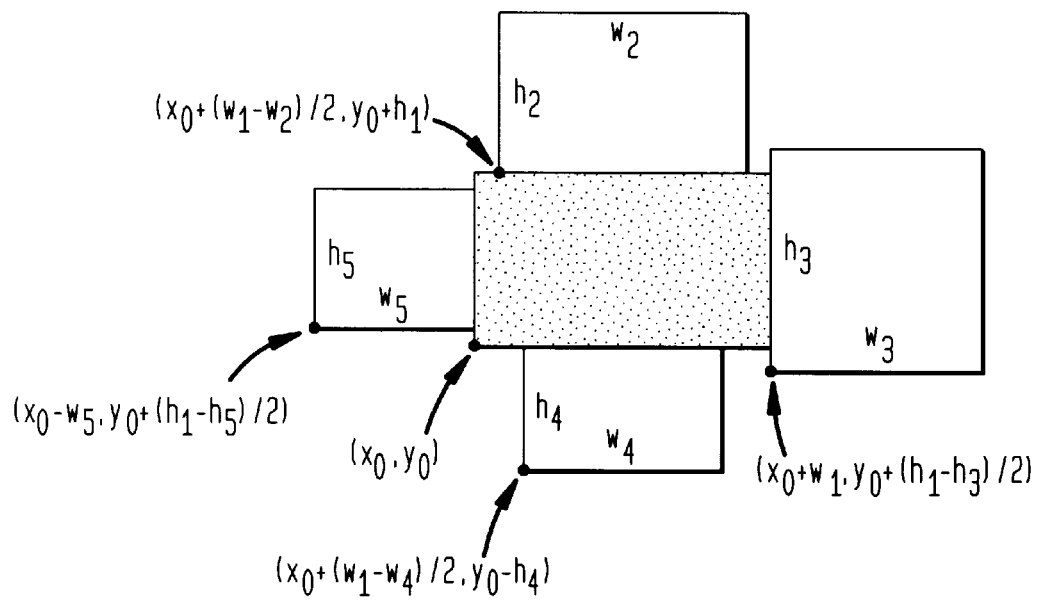
FIG. 13 is a diagram showing the formulas used for a self-configuration process according to the present invention.

When the system having the display unit 111 is powered-up, the system will go through a self-configuration process. One embodiment of such a self-configuration process for a given display system is shown in FIGS. 13–16. As shown, the self-configuration process assigns a set of coordinates to each display unit in the display area, and coordinates how it will display data on each display unit from these assigned coordinates. This process uses coordinate calculation based on the relationship depicted in FIG. 13. All the width and height of the display are predefined. To compute the lower left corner coordinates of all adjacent displays for a given display area with $(x_o, y_o)$ as the left corner coordinate, the formulas shown in FIG. 13 are used.

Figure 14:
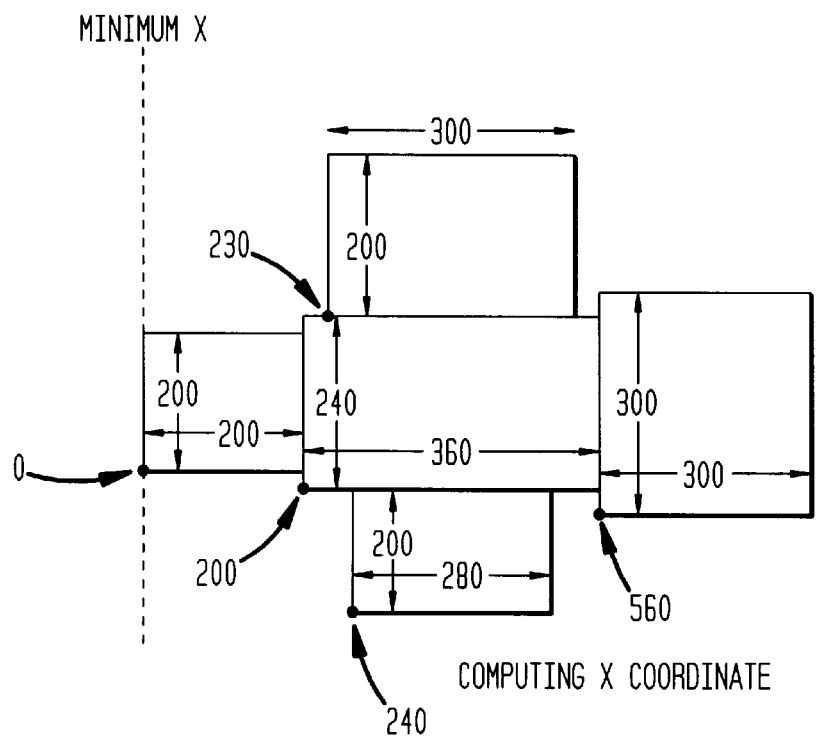
FIG. 14 is a diagram illustrating the calculation of an X coordinate for one embodiment of the present invention.
Figure 15:
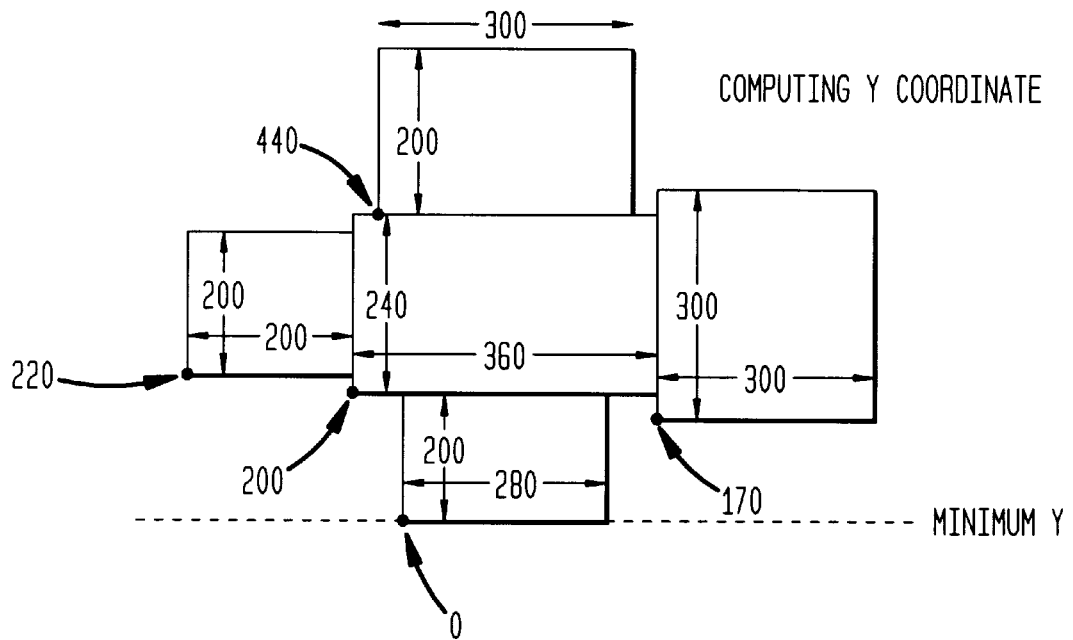
FIG. 15 is a diagram illustrating the calculation of the Y coordinate for one embodiment of the present invention.
Figure 16:
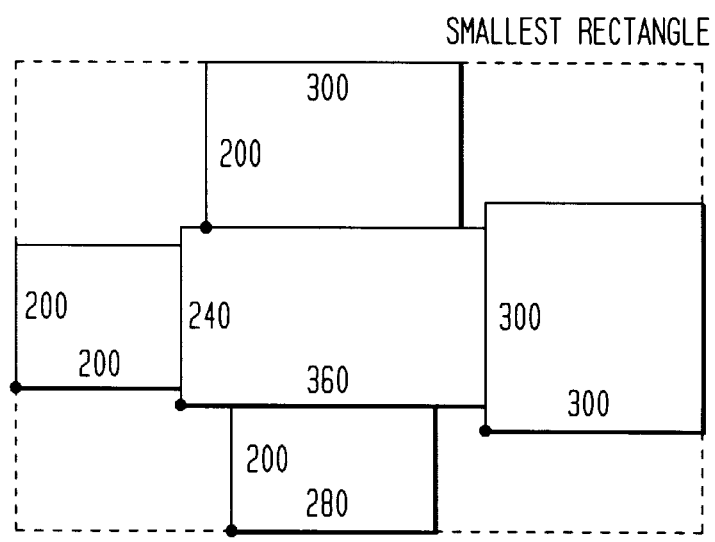
FIG. 16 is a diagram depicting a method of self-configuration according to the present invention using the smallest rectangle method.

In one embodiment, the self-configuration process consists of the following steps: (1) Using the following algorithm to find the coordinate value of the lower left hand corner of every display unit in the display area:

```
forall display d: X(d) = 0, Y(d)= 0
loop
    forall display d1,d2
        if adjacent(d1,d2) and not agree(d1,d2)
        then set X(d1), Y(d1), X(d2), Y(d2) to higher values
            according to the formulas and at the same time
            make agree(d1,d2) = true
        endif
until no changes in X or Y values.
``` comment: adjacent(d1,d2)=true means display d1 and d2 are adjacent to each other.

comment: agree(d1,d2)=true means the coordinate values of d1 and d2 follow the formulas (FIGS. 14 and 15 show two examples of x and y coordinates assigned to the lower left-hand corner of display units 11 according to the above process); and (2) finding the smallest rectangle that contains all the displays (FIG. 16 shows a diagram depicting the self-configuration process once the smallest rectangle has been determined).

After this self-configuration process, every display unit 111 knows its own relative position to all the other display units 111 as well as the bounding rectangle of the formation. Since this information is independent of any source device connected to the displays, each source devices needs to acquire this information from the display system and independently decide how to display information on the display area.

As a result, in order to effectively display any information on a display system according to the present invention, each source device connected thereto needs to have a mask list of the display area. A mask list is a list of geometric shapes of each display unit in the display area. In FIGS. 13–16 a rectangular display unit and a substantially rectangular display area is shown, wherein the rectangular display units are represented by their size and their relative positions with respect to each other. Thus, when the source device intends to display something, it uses the mask list to determine what commands to send over the data/command bus.

In addition to the mask list, the color spaces, brightness and contrast of each display unit 111 in the display area must be synchronized. Such a consistent presentation between the display units will provide a display that is more pleasing to the eye. The synchronization can be done automatically or manually, through control commands, at the desire of the system designer. Such control commands can be issued by the source devices to other source devices or the display units 111. The controller 4 of each display unit 111 needs to interpret these commands and respond accordingly.

In one embodiment of the invention, there are two groups of commands: control commands and data commands. Below is an illustrative list of commands for one embodiment of display unit 111.

Such control commands can be sent when the source device intends to control the status or request the status of the display unit, or even to communicate with other source devices. One type of control command, communication commands, are used to communicate between source devices. The communications commands include Quest for other source, Self Identify, and Talk. These commands are defined as follows:

Quest for other source: This command issued by a source device to find out whether there is any other source device connected to the display 110.

Self Identify: This command is sent by a source device to identify itself with enough information for other source devices to utilize.

Talk: This command is sent by a source device to another source device for general purpose communication.

Another type of control command, global commands, are sent when source devices communicate with all or part of the display units for global requests and actions. Global commands include Mask request, Reset, Redraw, Erase, Colormap distribution/consolidation, Display parameter adjustment, block movement and block copy. These commands are defined as follows:

Mask Request: After receiving this command, the formation of display units 111 will broadcast their own mask information over the data/control bus 10.

Reset: This command resets all the formation of display units 111 to their original status.

Redraw: This command tells all of the display units 111 to redraw the images from their VRAM 6.

Erase: This command tells all of the display units 111 to erase the contents of their VRAM 6.

Colormap distribution/consolidation: These commands distribute color lookup tables or ask the formation of multiple displays to enter some predefined color mode.

Display parameter adjustment: These commands tell the display units 111 to adjust their display parameters such as contrast, brightness, hue, etc.

Block movement: This command tells the formation of multiple display units 111 to do a pixel block movement. This action can be used to do content scrolling.

Block copy: This command tells the multiple display units 111 to do a pixel block copy.

Source devices also send data commands that direct the display units to display particular data on the display area.

Each display unit 111 of the display area interprets these commands and translates them into appropriate pixel values and stores the values in the VRAM 6. Two types of data commands are: primitive data commands and high level commands. Primitive data commands send data directly to fill the VRAM 6. During such data commands, the processor 4 does only a very simple data translation. On the other hand, high level data commands need processor power to transform high level requirements into primitive actions.

A primitive data command can have the general format (PRIMITIVE, x, y, length, data type, data), where PRIMITIVE is the command ID, x and y are the starting pixel coordinates, length is the length of the data, data type is the type of data, and data is the data stream. Examples of primitive data commands having the above format area as follows:

(PRIMITIVE, 100,100,32, bit, 0XA03E8798) means to put 32 monochrome data starting from pixel (100,100)

(PRIMITIVE, 0,200,4, index_color, 12,23,234,87) means to put 4 index color values 12,23,234,87 to pixel (0,200), (0,201), (0,202), (0,203)

(PRIMITIVE, 100,22,4,24_bit_true_color, (0,0,0),(23, 43,33), (128,255,234), (123,222,0)) means to put 4 24-bit true color RGB values (0,0,0), (23,43,33), (128,255,234), (123,222,0) to pixel (100,22), (100,23),(100,24),(100,25).

High level data commands have a similar format to various high level graphic environment Application Program Interfaces (API). The following are some examples of possible commands:

(SetForColor, R,G,B)—Set current foreground color to R,G,B.

(SetBackColor,R,G,B)—Set current background color to R,G,B.

(SetDrawWidth, n)—Set current drawing width to n (DrawLine, x0,y0,x1,y1)—Draw a line from (x0,y0) to (x1,y1)

(DrawRectangle, x,y,h,w)—Draw a rectangle from (x,y) with height=h and width=w.

(FillRectangle,x,y,h,w)—Draw a solid rectangle from (x,y) with height=h, width=w.

Since these commands are very high level, they demand a higher performance processor. This will increase the complexity of the display unit design, but reduce the complexity of the source device interface.

Applications for a display system according to the present invention are numerous. For example, Computer Aided Design (CAD)/circuit designer can use a large formation of display units to show a large part of a layout/design, wherein many engineers can work together sharing the display area. A second example is a classroom situation. Only one computer is used to control all the displays linked together via a network. The students would be able to time share on the computer and also share the display space. A third application could be in a residential home. Every residential home only needs one central computer with display units 111 scattered around the house for easy interaction. Yet, in another embodiment the display system can be used to link the participants of a computer game. Computers connected with a formation of displays can even compete with other computers. Finally, a display system according to the present invention can be used as a virtual reality display. These examples are meant to be illustrative only.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A panel display comprising a plurality of display units that form a display area, each said display unit having video random access memory (VRAM) for storing image data, a controller for processing broadcast data signals to provide said image data to said VRAM, and an image display panel for displaying said image data, wherein said controller for each said display unit is operable to accept concurrent broadcast data signals from multiple sources intended for said plurality of display units that form said display area, each said display unit being operable to process image information with respect to said display area independently from said multiple sources, calculate a relative location for each said display unit relative to other display units within said plurality of display units that form said display area, and extract an applicable portion of said image data from said broadcast data signals based upon said relative location.

2. The panel display of claim 1 wherein said display area is substantially rectangular.

3. The panel display of claim 2 wherein said display area is electrically coupled to a plurality of source devices.

4. The panel display of claim 3 wherein said plurality of source devices are selected from the group consisting of computers, cable TV adapters, broadcast adapters, camcorders, and digital cameras.

5. The panel display of claim 3 wherein each said display unit further comprises a bus for transporting power, control signals and data signals from said plurality of source devices to said display unit controller.

6. The panel display of claim 5 wherein each said display further comprises a data/control port to connect said bus to said plurality of source devices.

7. The panel display of claim 6 wherein said controller calculates said relative location for each said display unit relative to other display units within said plurality of display units that form said display area by assigning a set of coordinates to the position of each display unit in said display area.

8. The panel display of claim 7 wherein said relative location is determined by comparing said coordinates to find a minimum and a maximum X coordinate and a minimum and a maximum Y coordinate, and using said minimum and maximum X and Y coordinates to find a smallest rectangle containing the entire display area.

9. The panel display of claim 8 wherein said image display panels provide substantially the same pixel resolution.

10. The panel display of claim 2 wherein said formation of display units is electrically coupled to at least one I/O device.

11. The panel display of claim 10 wherein said I/O device is selected from the group consisting of network devices, pointer devices, keyboards, touch screens, printers, and wireless connectors.

12. The panel display as in claim 2 wherein said image display panel is flat.

13. The panel display as in claim 2 wherein said image display panel is a liquid crystal display.

14. The panel display as in claim 2 wherein said image display panel is a light emitting diode.

15. The panel display as in claim 2 further comprising a nonvolatile memory to store information for said image display panel.

16. The panel display as in claim 15 wherein said nonvolatile memory is erasable programmable read only memory (EPROM).

17. The panel display as in claim 15 wherein said nonvolatile memory is flash memory.

18. The panel display as in claim 2 wherein said controller is an embedded processor.

19. A panel display system comprising:

a plurality of display units forming a display area, each said display unit having a video random access memory (VRAM) for storing image data, a controller for processing data signals to provide said image data to said VRAM, and an image display panel for displaying said image data; and means for interconnecting said plurality of display units to form a non-overlapping display area, wherein said controller for each said display unit is operable to accept concurrent broadcast data signals from multiple sources intended for said plurality of display units that form said display area, each said display unit being operable to process image information with respect to said display area independently from said multiple sources, calculate a relative location for each said display unit relative to other display units within said plurality of display units that form said display area, and extract an applicable portion of said image data from said broadcast data signals based upon said relative location.

20. The panel display system as in claim 19 wherein said display area is substantially rectangular.

21. The panel display system as in claim 19 herein said interconnecting means comprises a panel display connector for electrically coupling said plurality of display units.

22. The panel display system as in claim 21 wherein said panel display connector comprises at least one data/control bus connector and at least one power line connector.

23. The panel display system as in claim 22 wherein said data/control bus connector is fabricated from the group consisting of plastic and metal.

24. The panel display system as in claim 22 wherein said power line connector is fabricated from the group consisting of plastic and metal.

25. The panel display system as in claim 21 wherein said display units have a front face, at least one side face, and a back face, said back face having at least one power port to receive said power line connector and said back face having at least one data/control port to receive said data/control bus connector.

26. The panel display system as in claim 25 wherein said data/control connector has a plurality of protrusions and said data/control port has a plurality of pins extending from said data/control port to be fitted into said plurality of protrusions of said data/control connector.

27. The panel display system as in claim 25 wherein said power line connector has a plurality of protrusions and said power port has a plurality of pins extending from said power port to be fitted into said plurality of protrusions of said power line connector.

28. The panel display system as in claim 19 wherein said image display panel is flat.

29. The panel display system as in claim 19 wherein said image display panel is a liquid crystal display.

30. The panel display system as in claim 19 wherein said image display panel is a light emitting diode.

31. The panel display system as in claim 19 further comprising a nonvolatile memory to store information for said image display panel.

32. The panel display system as in claim 31 wherein said nonvolatile memory is erasable programmable read only memory (EPROM).

33. The panel display as in claim 31 wherein said nonvolatile memory is flash memory.

34. The panel display as in claim 19 wherein said controller is an embedded processor.

35. The panel display system as in claim 19 wherein said means for interconnecting said plurality of units is selected from the group consisting of cables, network devices, local area networks, and wide area networks.

36. A panel display system comprising:

a plurality of display units arranged to form an image display area having a predetermined formation;

at multiple sources coupled to said display area, wherein each said source broadcast control and data signals to said display unit of said display area, each said display unit being operable to process image information with respect to said image display area independently from said multiple sources, each display unit having a video random access memory (VRAM) for storing image data, a controller for processing said data signals to provide said image data to said VRAM, and an image display panel for displaying said image data; and means for interconnecting said plurality of display units, wherein said controller for each said display unit is operable to accept concurrent broadcast data signals intended for said plurality of display units that form said display area, calculate a relative location for each said display unit relative to other display units within said plurality of display units that form said display area, and extract an applicable portion of said image data from said broadcast data signals based upon said relative location.

37. The panel display system as in claim 36 wherein said interconnecting means is selected from the group consisting of panel display connectors, cables, network devices, local area networks, and wide area networks.

38. The panel display system as in claim 36 wherein said source device is selected from the group consisting of computers, cable TV adapters, broadcast adapters, camcorders, and digital cameras.

39. The panel display system as in claim 36 wherein said display unit further comprises a bus for transporting said data signals from said source device to said controller.

40. The panel display system as in claim 39 wherein each said display further comprises a data/control port to connect said bus to said source device.

41. The panel display system as in claim 36 wherein said formation of display units is electrically coupled to at least one I/O device.

42. The panel display system as in claim 41 wherein said I/O device is selected from the group consisting of network devices, pointer devices, keyboards, touch screens, printers and wireless connectors.

* * * * *